3,010,787
PREPARATION OF CRYSTALLINE TITANIUM
CHLORIDE
Erik Tornqvist, Westfield, N.J., assignor to Esso Research
and Engineering Company, a corporation of Delaware
Filed Mar. 20, 1958, Ser. No. 722,797
8 Claims. (Cl. 23—87)

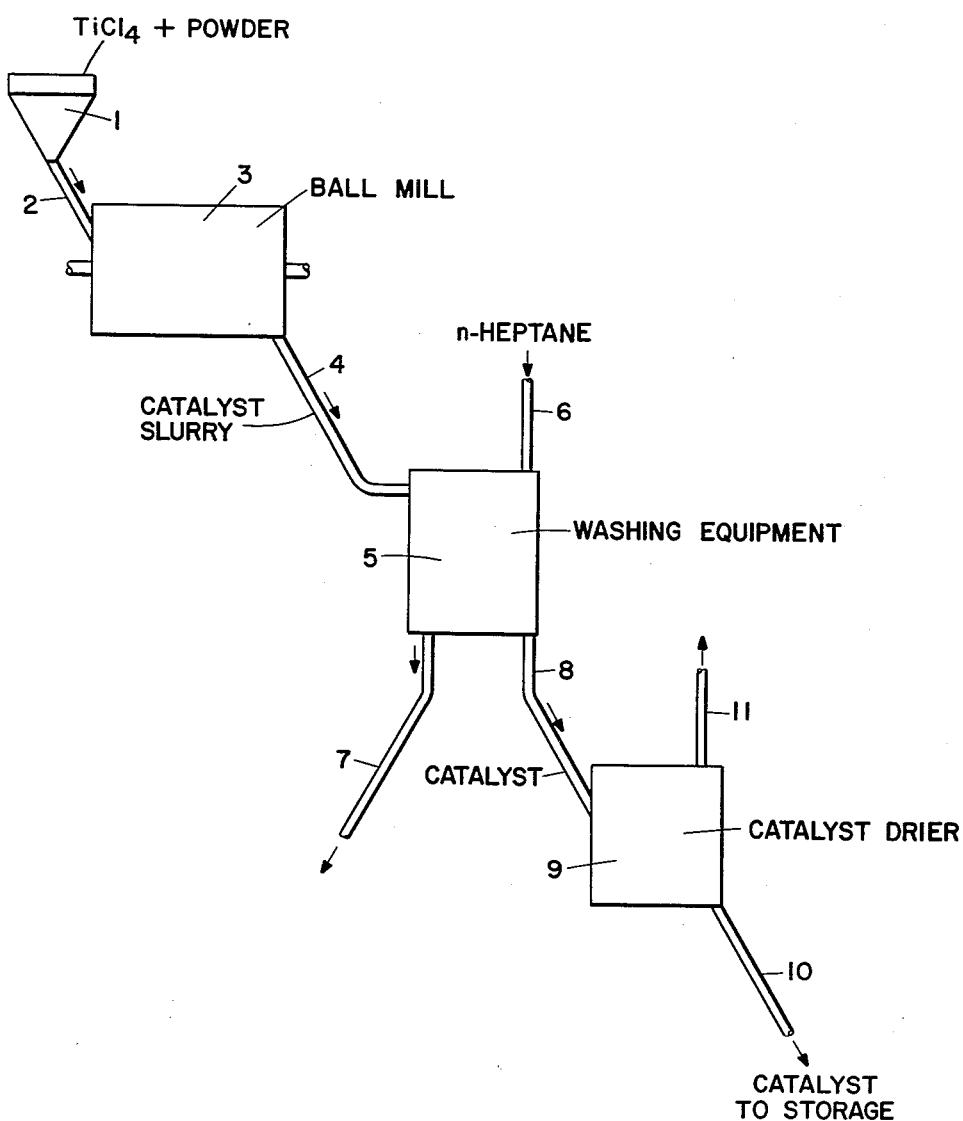

This invention relates to an improved method of preparing catalysts used in the low pressure polymerization of alpha olefins. More particularly it relates to a process for preparing crystalline, partially reduced, titanium chloride by the reduction of $TiCl_4$ with aluminum under mild and controlled conditions.

The low pressure polymerization and copolymerization of alpha olefins with catalyst systems made up of a partially reduced, heavy transition metal halide and a reducing metal-containing compound to high density, often isotactic, high molecular weight, solid, relatively linear products has been assuming ever increasing importance and is now well known, see e.g. Belgian Patent 533,362, "Chemical and Engineering News," April 8, 1957, pages 12 through 16, and "Petroleum Refiner," December 1956, pages 191 through 196.

The alpha olefinic feeds utilized in polymerization and copolymerization are $C_2$ to $C_{20}$ monomers and include ethylene, propylene, butene-1, heptene-1, dodecene-1, etc. with ethylene, propylene and butene-1 particularly preferred.

The conditions conveniently utilized are temperatures in the range of about 0° to 150° C. with intermediate temperatures preferred; pressures employed have varied from subatmospheric to 250 atmospheres with more moderate pressures preferred.

In some cases, particularly when polymerizing propylene, it has been found desirable to utilize preformed crystalline, purple, partially reduced titanium chloride catalysts. The use of this crystalline catalyst material in admixture with organo metallic activators results in more efficient polymerization and the obtaining of products of greater crystallinity.

Previously purple, crystalline, partially reduced titanium chloride has been prepared from $TiCl_4$ by a number of methods of which the following are the most important ones:

(1) Metal reduction at 190° C. or higher, usually about 250° C., when aluminum is used for part or all of the reduction, and about 400° C. or higher when titanium alone is used for the reduction.

(2) Hydrogen reduction at above about 650° C.

(3) Reduction with metal alkyls, $AlEt_3$ in particular, in a diluent at above about 150° C. under exacting conditions.

All these methods have some disadvantages. Metal and hydrogen reductions require fairly high temperatures and yield catalyst preparations which need to be ball milled in order to give high catalyst activity at moderate pressures.

The metal alkyl reduction of $TiCl_4$ has to be made under very carefully controlled conditions as described in copending patent application Serial No. 629,488, now abandoned, and Serial No. 667,277. In addition, the product sometimes does not yield polymers of very high crystallinity.

It has now surprisingly been found that this crystalline catalyst material can be prepared by intimately contacting $TiCl_4$ with finely divided aluminum powder at a moderate temperature, the maximum amount of aluminum employed being 10% above the stoichiometric amount.

The temperature employed is in the range of 20° to 100° C. and preferably 30° to 60° C. Use of excess aluminum results in the presence of excess metal which is difficult to remove. This in turn results in a colored product. The finely divided aluminum powder is also known as atomized.

The intimate contacting is most advantageously carried out in ball mill apparatus known to the art. The time of treatment will of course depend somewhat upon the intensity and temperature of treatment but will usually range from several hours to a few days.

The reduced crystalline, purple titanium chloride is believed to be composed predominantly of $TiCl_3$ and the reaction proceeds according to the equation:

$$3TiCl_4 + Al \rightarrow AlCl_3 + 3TiCl_3$$

It is to be understood that the limit based on stoichiometric amount is in turn based on this equation.

Organic diluents as hereinafter defined can be used from the beginning in the ball milling step but they are most preferably employed in its later stages and particularly after the reaction has been initiated or completed to remove unreacted $TiCl_4$.

When it is not desired, the unreacted aluminum can be removed from the polymer by treatment with alcoholic HCl or by using a solution process for the deashing. It is, however, also possible to get all the aluminum powder to react either by adding a sufficient excess of $TiCl_4$ in the beginning or by adding excess of $TiCl_4$. When it is desired to impart a metallic aluminum color to the polymer the excess, if any, can be retained.

A large number of reducing metal-containing compounds can be used to activate the reduced titanium chloride. Among the most valuable are alkyl aluminum compounds, especially trialkyl aluminum compounds such as triethyl aluminum, tripropyl aluminum, triisobutyl aluminum, etc. and dialkyl aluminum compounds such as diethyl aluminum halides, diethyl aluminum chloride in particular, dipropylhalides, diisobutylhalides, etc. Monoalkyl aluminum compounds can also be used. Generally, in addition to trialkyl or aryl aluminum, organo aluminum compounds carrying two or at least one hydrocarbon radical, as well as one or two electron attracting groups, such as halogen, alkoxy, organic nitrogen or sulfur groups, etc. may be used.

Systems of aluminum trialkyls and titanium halides are particularly preferred and useful, e.g. aluminum triethyl and reduced titanium tetrachloride. In general, mol ratios of 0.5:1 or higher of aluminum trialkyl to reduced titanium tetrachloride are employed.

The amount of catalyst system used may vary within wide limits depending somewhat on the purity of the olefin feed. Proportions of as little as 0.1 part by weight of catalyst per 1,000 parts by weight of olefin are sufficient if the feed is pure. With olefin feed streams containing about 0.01% of water, oxygen, carbon dioxide or certain other oxygenated compounds, catalyst proportions of about 0.1–10 g. per liter of reaction mixture are usually adequate.

The complete catalysts are, quite generally, prepared by intimately mixing the aluminum organic compound and reduced titanium chloride preferably in an organic diluent and in a non-oxidizing atmosphere while stirring. The catalyst components are preferably mixed at low temperatures, room temperature or 20° to 50° C., prior to heating. This can be accomplished in a batch or continuous operation. Paraffinic hydrocarbons such as propane, isopentane, heptane, decane or other saturated petroleum or synthetic hydrocarbon oils, e.g. white mineral oil, naphthenes such as methyl cyclohexane or decalin aromatics such as benzene, toluene, xylene, etc. are suitable diluents. It is important that a suitably high boiling diluent or a high enough pressure be chosen to maintain the diluent liquid at the temperature employed.

The polymerization reaction itself is preferably carried out while stirring in batch or continuous operation in added organic diluent liquid of the same nature as indicated. When operating batchwise, olefin introduction is continued until the catalyst is wholly or partially exhausted and the reaction slows down. Sufficient pressure may be applied during the reaction to maintain the lower boiling diluents in a liquid state. The final or equilibrium polymer concentration in the reaction mixture may be about 10 to 40 wt. percent.

Upon completion of the polymerization reaction the catalyst can be completely deactivated, e.g., by the addition of an alcohol such as methyl, isopropyl or n-butyl alcohol, in amounts of about 10 to 100 times the amount of catalyst used. The reaction slurry can then be filtered, the filter cake re-slurried in a catalyst solvent, such as dry, concentrated alcohol at about 50° to 100° C. for 15 to 60 minutes, filtered again and the filter cake dried, preferably under reduced pressure. A suitable oxidation inhibitor may also be added during the polymer recovery procedure. Ash residues in the polymer are reduced below about 0.05% by this procedure. If necessary, the ash content may be further reduced by aqueous acid treatment, etc., according to methods well known in the art, or by using chelating agents, such as acetylacetone. The organic diluents can be recovered for use in catalyst preparation, polymerization, etc.

The polymers produced have molecular weights in the range of about 100,000 to 300,000 or even as high as 3,000,000 as determined by the intrinsic viscosity method using the I. Harris Correlation (J. Polymer Science, 8,361, 1952). They have a high degree of crystallinity and a low solubility in n-heptane, somewhat depending on polymerization conditions and amount of low molecular weight amorphous polymer recovered separately.

This invention will be better understood by reference to the following process description, the flow diagram and the examples.

A finished purple $TiCl_3$ can be prepared directly in the ball mill if this has been so designed that it can be used for washing and drying of the catalyst. In this case the catalyst is prepared in the following steps.

(1) Charge $TiCl_4$ and Al powder in desired proportions to the ball mill jar.

(2) Ball mill until a thick slurry of $TiCl_3$ in $TiCl_4$ has been formed or until all the aluminum has reacted.

(3) If needed, add more $TiCl_4$ to secure complete reaction of the aluminum or, if sufficient $TiCl_4$ is present but the reaction has been stopped before completion by the formation of too thick a slurry or a paste which prevents good milling, add a sufficient amount of a suitable inert hydrocarbon diluent such as n-heptane, n-decane, cyclohexane, toluene or xylene to form a sufficiently thin slurry to make good milling and a complete reaction possible.

(4) Ball mill until all aluminum has reacted. Steps 3 and 4 may be eliminated when the desired degree of reaction can be accomplished in step 2.

(5) Wash the catalyst directly in the ball mill with a suitable inert diluent of the type mentioned in step 3. Filter or drain off the $TiCl_4$-diluent mixture. Repeat the washing until little or no $TiCl_4$ can be detected in the wash liquid. The $TiCl_4$ and the diluent may be separated and recovered by distillation.

(6) Dry the catalyst in the ball mill by applying vacuum for a sufficient time, if necessary under slight heating, about 50°–100° C. Alternatively, the catalyst can be dried by purging with a hot inert gas.

(7) Ball mill the catalyst dry for a desirable time.

(8) Recover the finished catalyst. This can, among others, be done in slurry form by adding a suitable diluent and draining the slurry out of the ball mill. Aliquots of this slurry can be used directly for preparing the complete alkyl metal activated polymerization catalyst.

Referring now to the flow diagram, 3800 g. $TiCl_4$ and 90 g. of aluminum powder, the aluminum thus being present in the amount of ½ of the stoichiometric, are charged from hopper 1 through line 2 to ball mill 3. The materials are ball milled for 24 hours until a thick slurry of $TiCl_3$ in $TiCl_4$ has been formed. The catalyst slurry containing unreacted $TiCl_4$ is withdrawn through line 4 into washing equipment 5, e.g. a centrifuge filter. N-heptane is added through line 6 which dissolves the $TiCl_4$. The $TiCl_4$ solution in the n-heptane is withdrawn through line 7. The diluent and excess $TiCl_4$ can be recovered for re-use by distillation. The $TiCl_3$ catalyst is withdrawn through line 8 to a drier 9. It is dried under mild conditions, e.g. reduced pressure using a temperature of about 50° to 60° C., if necessary. Purging with a hot inert gas such as nitrogen, argon or $CO_2$ also can be employed. Vaporous materials leave through line 11. The dried catalyst is then withdrawn and sent to storage through line 10. It can subsequently be mixed with the aluminum alkyl as described previously.

EXAMPLE 1

Purple $TiCl_3$ was prepared by ball milling 190 g. (1 mole) of $TiCl_4$ with the stoichiometric amount (9 g.=⅓ atom) of atomized aluminum at 40°–50° C. for 2 days. Reaction took place but did not go quite to completion because a thick purple paste was formed which prevented further milling action. A more complete reaction was obtained after the mixture had been slurried in a minimum amount (about 100 ml.) of n-heptane and milled for another 5 days. The final reaction mixture was filtered, washed with n-heptane and dried in vacuo. 129 g. of a light purple material was recovered.

EXAMPLE 2

A purple, crystalline catalyst prepared as described in Example 1 was tested for propylene polymerization with n-heptane diluent and $AlEt_3$ as the activator at an Al/Ti ratio of 2. The results and further details on the conditions are shown in the table directly below.

Table I

| | |
|---|---:|
| Catalyst: | |
| $TiCl_3$—0.33$AlCl_3$, g | 0.497 |
| $AlEt_3$, g.[1] | 0.474 |
| Reaction conditions: | |
| Al/Ti mole ratio | 2 |
| Temperature, °C | 60 |
| Run length, hours | 2 |
| Catalyst concn., g./l | 0.97 |
| Results: | |
| Max. absorption rate, ml./g./min | 1620 |
| Yield, g | 152 |
| Waxy polymer, percent | 3.1 |
| Catalyst efficiency, g./g | 156 |
| Properties of solid polymer | |
| Mol. wt.×$10^{-3}$ | 165 |
| Heptane insolubles, percent | 83.7 |
| Soft. pt./melt. pt., °C | 152/157 |
| Tensile strength, p.s.i | 2360 |
| Ash, wt. percent | 0.033 |
| Elongation, percent | 145 |
| Density, g./ml | 0.892 |

[1] $AlEt_3$ was added as 0.88 M solution in n-heptane. Components were mixed in an addition funnel and n-heptane was added to give a total volume of 100 ml. The catalyst mixture was allowed to stand for 30 minutes before being added to the reactor.

This data show that extremely good catalyst efficiency, i.e. 156 g./g. was obtained in 2 hours. This compared favorably with other preformed catalysts and is much better than the so-called pretreated catalysts. The polymer yielded molded pads of good flexibility and strength and completely without tack.

EXAMPLE 3

A more crystalline polymer was obtained at even higher rates than in Example 2 when xylene was used as the diluent instead of n-heptane. The results and details on the conditions are shown in Table II.

Table II

Catalyst:

| | |
|---|---|
| TiCl$_3$—0.33AlCl$_3$, g | 0.497 |
| AlEt$_3$, g | 0.474 |

Reaction conditions:

| | |
|---|---|
| Al/Ti mole ratio | 2 |
| Temperature, °C | 75 |
| Run length, hours | 2 |
| Catalyst concn., g./l | 0.97 |

Results:

| | |
|---|---|
| Max. absorption rate, ml./g./min | 1500 |
| Yield, g | 162.3 |
| Waxy polymer, percent | 3.6 |
| Catalyst efficiency, g./g | 169 |

Properties of solid polymer:

| | |
|---|---|
| Mol. wt.×10$^{-3}$ | 163 |
| Soft. pt./melt. pt., °C | 155/160 |
| Tensile strength, p.s.i | 3540 |
| Elongation, percent | 140 |
| Density, g. ml | 0.895 |

The solid polymer obtained in this experiment had a high degree of crystallinity as evidenced by its good physical properties even though only 3.6% of low mol. wt. waxy polymer had been removed during the polymer recovery procedure. An even more crystalline solid polymer could be recovered by removing 6–7% of the more amorphous low mol. wt. polymer. Neither as high polymerization rates nor a polymer of as high a degree of crystallinity have been obtained previously with an alkyl metal activated reduced titanium halide catalyst prepared at moderate temperatures, below about 150° C.

The molded pads of this polymer were more rigid and had a higher tensile strength than those of the polymers obtained in n-heptane. It was also completely free of tackiness.

Shorter milling times in the ball mill can be used, if chrome alloy steel balls are used for the milling instead of flint pebbles. Separate experiments have indicated that a 4–5 fold increase in milling efficiency can be obtained in this way. Hence it is possible to prepare a finished catalyst in 1–2 days.

The advantages of this invention will be apparent to the skilled in the art. The need for elevated temperature equipment is eliminated. A highly active polymerization catalyst able to form highly crystalline polymers of alpha-olefins is prepared in essentially one step in good yields and with simple equipment. Good reproducibility and process control are obtained.

It is to be understood that this invention is not limited to the specific examples which have been offered merely as illustrations and that modifications may be made without departing from the spirit of the invention.

What is claimed is:

1. A process for the preparation of a crystalline, purple, partially reduced titanium chloride which comprises intensely grinding finely divided aluminum powder with titanium tetrachloride at a temperature in the range of 20° to 100° C., the maximum amount of aluminum utilized being 10% above the stoichiometric amount.

2. The process of claim 1 in which the intense grinding is carried out in a ball mill.

3. The process of claim 1 in which the temperature utilized is one of 30° to 60° C.

4. The process of claim 1 in which the intimate grinding is carried out in the presence of added inert hydrocarbon diluent after the reaction has been initiated.

5. A process for the preparation of a crystalline, purple, partially reduced titanium chloride which comprises the steps of intimately contacting titanium tetrachloride with finely divided aluminum powder at a temperature in the range of 30° to 60° C. in a ball mill, the maximum amount of aluminum utilized being 10% above the stoichiometric amount; washing the resultant mixture with an inert hydrocarbon diluent to dissolve and remove unreacted titanium tetrachloride and drying the residual crystalline, partially reduced titanium chloride free of hydrocarbon diluent.

6. The process of claim 5 in which the washing and drying steps are also carried out in the ball mill.

7. The process of claim 1 in which chrome alloy steel balls are used in the ball milling.

8. The process of claim 5 in which chrome alloy steel balls are employed in the ball mill.

References Cited in the file of this patent

UNITED STATES PATENTS

| | | |
|---|---|---|
| 2,618,549 | Glasser et al. | Nov. 18, 1952 |
| 2,745,735 | Byrns | May 15, 1956 |
| 2,765,270 | Brenner et al. | Oct. 2, 1956 |
| 2,816,817 | Stein et al. | Dec. 17, 1957 |
| 2,880,199 | Jezl | Mar. 31, 1959 |

FOREIGN PATENTS

| | | |
|---|---|---|
| 811,633 | Great Britain | Apr. 8, 1959 |
| 1,132,506 | France | Nov. 5, 1956 |

OTHER REFERENCES

Ruff and Neumann: "The Reduction of Titaniumtetrachlorides," Zeit. für anorg. und allgem. Chemie, 128, 81–95 (1923); see Chem. Abstracts, 17, 2842, 2 (June–Oct. 1923).

Koontz and Nicholson: "The Reaction of Metallic Copper with Titanium Chloride," Jour. Amer. Chem. Soc., 70, 1936–7 (Jan.–June 1948).

Barksdale: "Titanium," page 81 (1949), published by the Ronald Press, New York.